United States Patent [19]
McClure et al.

[11] Patent Number: 4,807,279
[45] Date of Patent: Feb. 21, 1989

[54] REMOTELY PROGRAMMABLE CALL FORWARDING CONTROL DEVICE

[75] Inventors: William C. McClure, Denver, Colo.; Bob C. Kunce, Joplin, Mo.

[73] Assignee: H&M Communications

[21] Appl. No.: 1,150

[22] Filed: Jan. 7, 1987

[51] Int. Cl.$^4$ ............................................. H04M 3/54
[52] U.S. Cl. .................................... 379/211; 379/210
[58] Field of Search ............... 379/211, 212, 210, 213, 379/214

[56] References Cited

U.S. PATENT DOCUMENTS

| | | | |
|---|---|---|---|
| 3,178,516 | 4/1965 | Bonanno | 379/211 |
| 3,544,729 | 12/1970 | Stevens | 379/211 |
| 4,413,158 | 11/1983 | Danner | 379/211 |
| 4,475,009 | 10/1984 | Rais et al. | 379/211 |
| 4,670,900 | 6/1987 | Waldman | 379/211 |
| 4,677,663 | 6/1987 | Szlam | 379/211 |

*Primary Examiner*—James L. Dwyer
*Attorney, Agent, or Firm*—James E. Pittenger

[57] ABSTRACT

An apparatus and method is provided for remotely cancelling or reprogramming the call forwarding service provided by the telephone company on the customer/user's telephone line. A microprocessor is utilized in conjunction with external memory provisions as well as a keypad with DTMF-tone generator. The keypad and DTMF-tone generator are provided for inputting the call forwarding code data and preprogrammed telephone number into memory. A ring detector causes the microprocessor to seize the telephone line and automatically dial the preprogrammed telephone number. This allows the customer/user to answer the automatically dialed telephone call at the remote telephone location so that by inputting a proper code number into the line the user may take control of the operation of the device. At this point the preprogrammed telephone number can be cancelled or changed. Upon completion of the reprogramming and the release of the telephone line by the user the microprocessor automatically seizes the telephone line and dials the correct codes and telephone number into the telephone company system to either cancel or reprogram the call forwarding telephone number as required. Audio voice prompts as well as audio feedback of the actual numbers programmed into the dialer are provided.

14 Claims, 5 Drawing Sheets

Fig_1

Fig_2

Fig_3

Fig_4

Fig_5

Fig_6

REMOTELY PROGRAMMABLE CALL FORWARDING CONTROL DEVICE

FIELD OF THE INVENTION

This invention is directed to a device which allows a user from a remote telephone station to cancel or reprogram the transfer of telephone calls being received on his original telephone line. It is more specifically directed to a device for remotely reprogramming the telephone company call forwarding system.

BACKGROUND OF THE INVENTION

In the past a number of devices have been developed for causing a telephone call on a user's incoming telephone line to be automatically diverted to a different designated telephone line. This diversion of incoming telephone calls is commonly called "call forwarding". The telephone company provides the call forwarding service as one of several auxiliary services that are provided for customers.

In addition, various telephone inline switching devices have been developed for diverting and rerouting incoming telephone calls automatically. It is common practice for most of these devices to utilize a two-line system whereby as a telephone call is received on one line it is automatically diverted out to a preprogrammed telephone number on the second line.

The telephone company service which is provided under call forwarding is a service that allows the customer/user to access the system by dialing a code on his telephone instrument such as 72#. This code number accesses the call forwarding system and the telephone number to which the incoming calls are to be diverted is then dialed into the system usually by use of a touchtone or DTMF keypad. If the remote designated telephone instrument is answered, the connection is automatically completed. However, on the other hand if there is no answer at the remote instrument or if the line is busy, the user must then hang up and dial a second time to complete the call forwarding program.

Under normal conditions the customer/user, if he wants to cancel the call forwarding service, must return to his original telephone station and dial a second code such as 73# to cancel the preprogrammed call forwarding service. After cancellation the telephone line can be used in the normal way or a new call forwarding telephone number can be programmed by repeating the above cycle.

Since the use of the call forwarding service provided through the telephone company has been found to be the most economical and expeditious, most of the prior art devices up to this point have been directed to providing some method of remotely changing or reprogramming the call forwarding telephone number in the telephone company equipment without having to return to the original telephone station. Although some of these methods have been marketed, they have not proven to be as efficient or have the ease of operation that is necessary to make a system or a device of this nature economically practical.

An example of a prior art system is the arrangement whereby two or more calls to the original telephone number are required within a specified time interval. Once the proper number of calls has been received within the time required the device automatically initiates and dials a cancellation of the call forwarding function. After this has been accomplished the person may call his original telephone number again and after providing the required code number can reprogram his device with a new remote telephone number. After the reprogramming is complete the device will automatically seize the telephone line and establish the new call forwarding number once the user has disconnected from the line. This arrangement is rather cumbersome due to the fact that a plurality of telephone calls must be initiated to the original telephone number in order for the machine to properly sense the requirement that the call forwarding function must be terminated in order for the use to regain control over the call forwarding function up until now, this is the only way that has been possible to recapture control of the device in order to reprogram the call forwarding service from a remote location. It is also noted that these calls can be made from any remote location in the telephone system which allows the remote programming to be actuated by an unauthorized individual having access to the required code or the call forwarding service can be accidentally terminated by two or more calls being received coincidentally within a short time period from an innocent third-party.

INFORMATION DISCLOSURE STATEMENT

The following patents which are believed to be pertinent to the subject matter of this invention are presented in compliance with the inventor's duty to disclose all materials of which he is aware.

The Rais, et al. patent (U.S. Pat. No. 3,544,729) discloses a device for allowing a subscriber to remotely control the call forwarding process on his original telephone line. This function is accomplished by requiring the subscriber or another to call the original telephone number twice within a timed interval from any telephone station. Once the correct number of calls has been received, the device automatically dials a termination of the call forwarding procedure to the telephone company switching circuit. Once this has been accomplished, the subscriber can then call his number a third time with a proper code identification and reprogram the dialer to establish the call forwarding procedure for a new telephone remote location. Once this reprogramming has been accomplished the device again initiates the call forwarding procedure. The arrangement provided in this device is quite cumbersome and inefficient when compared with the novel single call arrangement provided by the applicant.

The Danford patent (U.S. Pat. No. 4,413,158) discloses an automatic call forwarding telephone device. In this circuit a call forwarding code number and a remote telephone number is programmed into the unit. When it is desired to initiate the call forwarding feature a manual switch is activated which causes the device to automatically dial the call forwarding procedure into the telephone company switching circuit. A fail-safe feature is provided where the ringing of the subscriber's telephone line a prearranged number of times will cause the device automatically to initiate the procedure. For cancellation of the procedure it is necessary for the subscriber to return to his original telephone location.

The Stevens patent (U.S. Pat. No. 3,544,729) provides an automatic call forwarding device. This arrangement does not utilize the telephone company call forwarding service but provides an automatic call forwarding arrangement utilizing two input telephone lines. In this device when a call is received on one line it is automatically diverted out on the second line to a preprogrammed telephone number which is automatically dialed. A number of telephone lines and preprogrammed telephone numbers can be utilized with in this device. In addition, an audible announcement indicating that a transfer is in progress can be provided as well as an audible indication of the telephone number to which the call is being transferred.

The Bronnano patent (U.S. Pat. No. 3,178,516) merely shows a conventional call forwarding arrangement. This device allows the subscriber to access the call forwarding register within the telephone exchange either through his original telephone line or through a different line to which the call forwarding register has been preprogrammed. Any calls trying to access the register other than through these two lines will be prevented from obtaining control of the call forwarding register. This arrangement provides security for the subscriber and prevents others from controlling the call forwarding feature.

SUMMARY OF THE INVENTION

The present invention is directed to a device which can be included as part of a voice-mail telephone system or a telephone answering machine or system, or can be provided as a stand-alone device connected in front of the telephone instrument and answering machine.

With this device the user's telephone line is manually programmed with a remote telephone number through the call forwarding service provided by the telephone company. Whenever a call is received on the user's telephone line a "half-ring" signal is applied to the original user's telephone line and instrument at the same time that the call is transferred to the remote preprogrammed location. This "half-ring" is sensed by the user's call forwarding device which after a very short delay seizes the telephone line and dials the preprogrammed telephone number of the remote location.

To reprogram or terminate the call forwarding service the user can dial his own telephone number from the remote location and then "hang up" after one ring cycle. Upon sensing the half-ring the device captures the telephone line and dials out the number of the remote location. The user can then answer the automatically dialed telephone call at the remote location and then reprogram the device by inserting a personal code as well as a new call forwarding remote telephone number or in the alternative a code to terminate the call forwarding process. After the subscriber has hung up, the device can then automatically recapture the telephone line and perform the commanded function.

In this way, through one telephone call the subscriber/user can control his telephone line and change or terminate the call forwarding process as he desires. For security purposes this reprogramming can only occur from the preprogrammed remote telephone location.

This invention can also include an audio voice prompt to aid in the reprogramming of the device as well as audio feedback of the actual numbers programmed into the dialer device.

Other features and advantages of the present invention will become apparent from the following detailed description of the invention when it is considered in conjunction with the accompanying drawings.

DETAILED DESCRIPTION OF THE INVENTION

Figure 1:
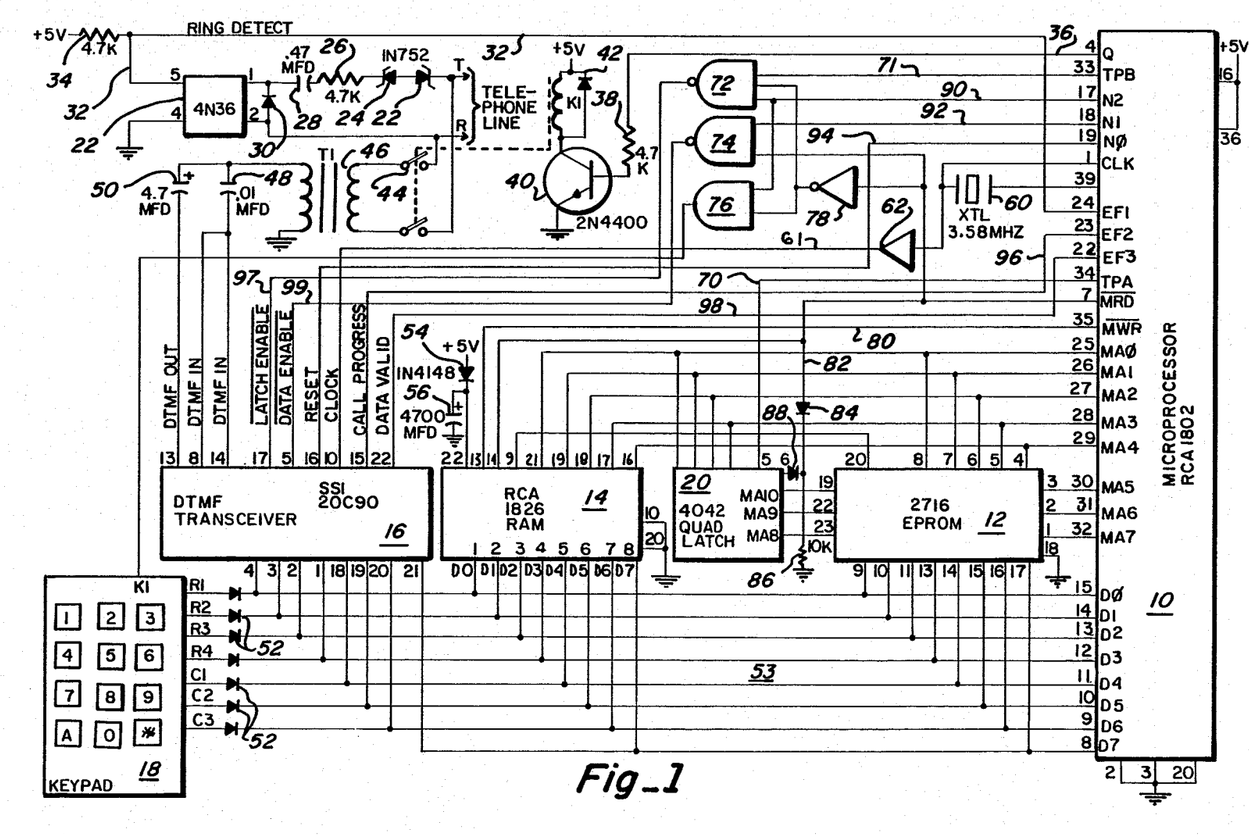
FIG. 1 is a schematic of the electrical circuitry provided in the present invention.

Turning now more specifically to the drawings FIG. 1 shows a schematic of the electrical circuitry making up the present invention. All of the components in this circuit are located usually on a single printed circuit board with proper layout to provide the necessary electrical leads and connections.

The basic components making up the circuitry include a Microprocessor (RCA 1802) 10; Erasable Programmable Read Only Memory (EPROM) (RCA 2716) 12, Random Access Memory (RAM) (RCA 81826) 14, touchtone keypad 18, Dual Tone Multifrequency (DTMF) transceiver (20C90) 16 and Quad Latch (RCA CD4042) 20. These components provide all of the working functions which provide the novel automatic sequencing apparatus making up the computer operated system.

The telephone line is connected to the circuit terminals T (tip) and R (ring) with the tip side of the telephone line connected through the overvoltage protection zenner diodes 22, 24, resistor 26 and capacitor 28 to the bridge connected diode ring detector 22. The ring side of the telephone line is connected directly to the detector 22. A diode shunt 30 is connected across the connections to the detector for the protection of the internal diodes. Plus 5 volts D.C. is connected to pin 5 of the ring detector through resistor 34 with pin 4 of the detector grounded. Pin 5 of the detector through lead 32 also provides a ring detection signal to pin 24 of the microprocessor 10.

Upon sensing a ring voltage pulse on the telephone line, the microprocessor 10 causes a biasing voltage to be generated on pin 4, lead 36 and resistor 38 to the base of transistor 40. The application of this bias causes the transistor 40 to conduct causing the relay 42 to close the normally open contacts in the "On-Hook" switch 44. Actuation of the relay 42 causes the telephone line to be seized causing the DTMF transceiver 16 to be connected through transformer 46. Tone inputs being received through the transformer 46 are transferred to the DTMF transceiver 16, through blocking capacitor 48 to pins 8 and 14. Tone output signals are provided through pin 13 and are connected to the transformer 46 through capacitor 50.

The output leads R1–R4 and C1–C3 from the touchtone keypad 18 are connected through blocking diodes 52 sequentially to the respective data input pins on the DTMF transceiver 16, RAM 14, EPROM 12, and microprocessor 10. The memory data inputs provide for the storage in the proper memory locations for each of the encoded telephone number inputs provided either through the keypad 18 or incoming on the telephone line from the remote location. In the same way the memory address outputs MA1–MA4 are connected from the output pins of the microprocessor sequentially to the EPROM 12 as well as the RAM 14. At the same time the memory address outputs MA0–MA3 are also connected to the quad latch 20. In addition the memory addresses MA5-MA7 are connected between the microprocessor 10 and the EPROM 12 while memory address MA8-MA10 are connected between the EPROM 12 and quad latch 20.

In order to retain the volatile memory which is provided in the RAM 14 plus 5 VDC is connected to pin 22 of the RAM 14 through diode 54 and filter capacitor 56. This voltage can also be provided by an auxiliary battery or other suitable backup source to retain the memory during power interruption. The leads interconnecting the data D0-D8 pins of the microprocessor 10 to the EPROM, RAM, DTMF transceiver and keypad is considered to be a bidirectional data bus while the memory address connections MA0-MA10 and leads are considered to be the memory address bus.

For timing purposes an external crystal 60 is connected in parallel through pins 1 and 39 of the microprocessor 10 so that the clock frequency of the microprocessor is established at a precise 3.579545 MHZ. This clock frequency is also connected through divider 62 to the clock input pin 10 on the DTMF transceiver 16. This frequency input to the DTMF transceiver provides a stabilized frequency count for the purpose of establishing the precise frequency for the tones generated for the touchtone keypad 18. By the same token the clock pulses allow precise conversion of the analog signals to digital and digital to analog required for the receiving and the transmission of the preprogrammed telephone numbers and dialing codes.

In addition to the clock circuitry mentioned above the microprocessor 10 outputs a timed pulse at pin 34 which is connected by lead 70 to pin 5 of the quad latch 20. This provides the time switching of the polarity in the latching circuits for proper sequencing of the memory address logic. A second timed pulse present at pin 33 of microprocessor 10 is connected by lead 71 to NAND gate 72. A memory write pulse is provided at pin 35 of the processor through lead 80 to pin 13 of the RAM 14. This is a negative pulse which appears in the memory-write cycle after the memory address bus has been stabilized. In addition a memory read output is connected from pin 7 of the processor through lead 82 and diode 84 to the chip select inputs on the EPROM 12, RAM 14 and to ground through resistor 86. Lead 82 is also connected through diode 88 to the polarity input pin of the quad latch 20. In this way the input/output instructions from the microprocessor can select or deselect the desired memory device depending upon the level of output from pin 7. At the same time the memory read instructions on lead 82 is connected to the input of NAND gate 74 as well as the inputs of NAND gate 72 and AND gate 76 through inverter 78.

Output instructions provided on pin 17 of the processor is connected by lead 90 to the inputs of logic gates 72 and 76. Input/output commands are also fed from pin 18 of the processor by lead 92 to the input of NAND gate 74. The third input/output command functions at pin 19 on the processor is connected by lead 94 to the reset input 16 on the DTMF transceiver 16. An input signal indicating call in progress status is provided on pin 15 of the DTMF 16 through lead 96 to pin 23 for flag status indication in the microprocessor 10. In addition, a data valid status flag input is provided from pin 22 of the DTMF 16 through line 98 to status input 22 on the microprocessor 10.

With proper signal level inputs to NAND gate 72 an output is produced on lead 100 to the latch enable input 17 on the DTMF transceiver. By the same token the proper inputs to the NAND gate 74 will produce an output latch signal on lead 102 to the data enable input on pin 5 of the DTMF transceiver. It is to be understood that +5 VDC is also applied to the microprocessor pins 16 and 36 and that the processor as well as the memory devices are properly grounded as shown in the schematic.

Figure 6:
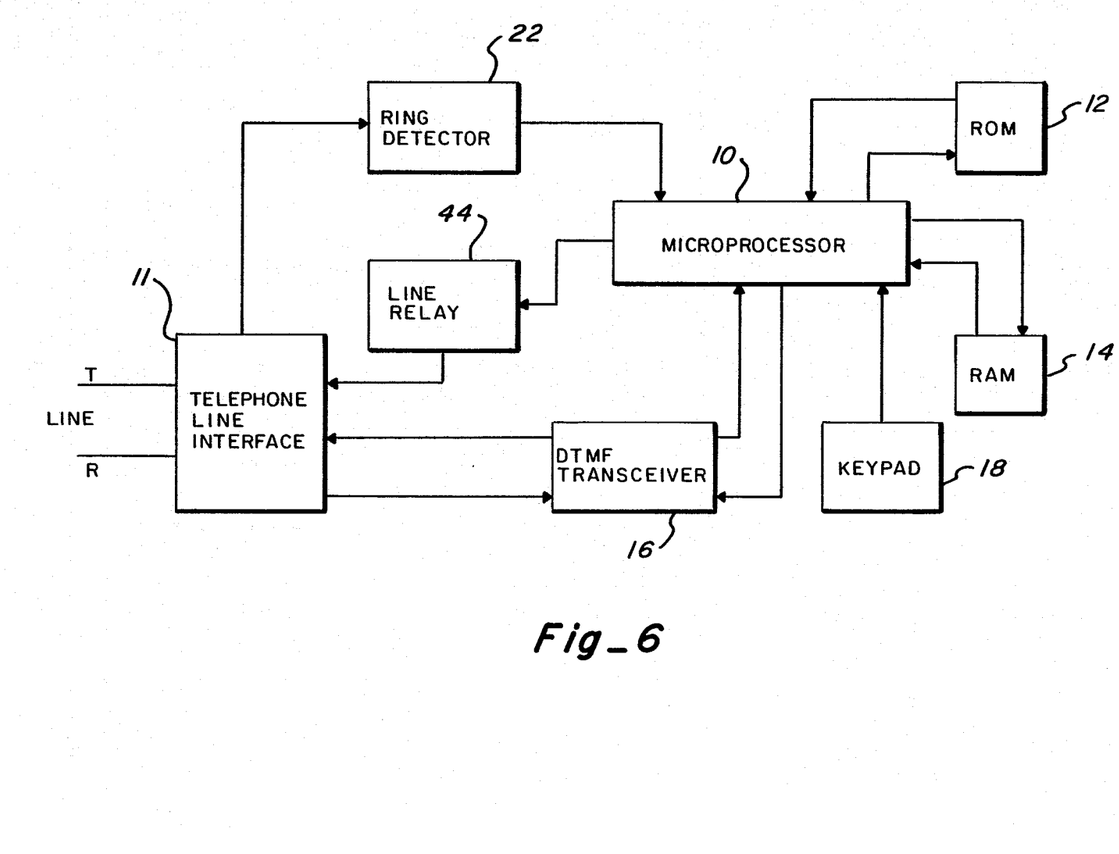
FIG. 6 is a block diagram of the circuitry shown in FIG. 1.

A block diagram of the functional operation of the device according to the present invention is shown in FIG. 6. This diagram presents a very simplified explanation of the operation of the components shown in the schematic and described above.

Software

In order for the microprocessor to perform its intended function it is necessary to input the proper software program into the EPROM 12 in order to provide the necessary instructions for the sequential operation of the device. Accordingly, FIGS. 2-5 show the software flow charts for accomplishing the desired task.

Figure 2:
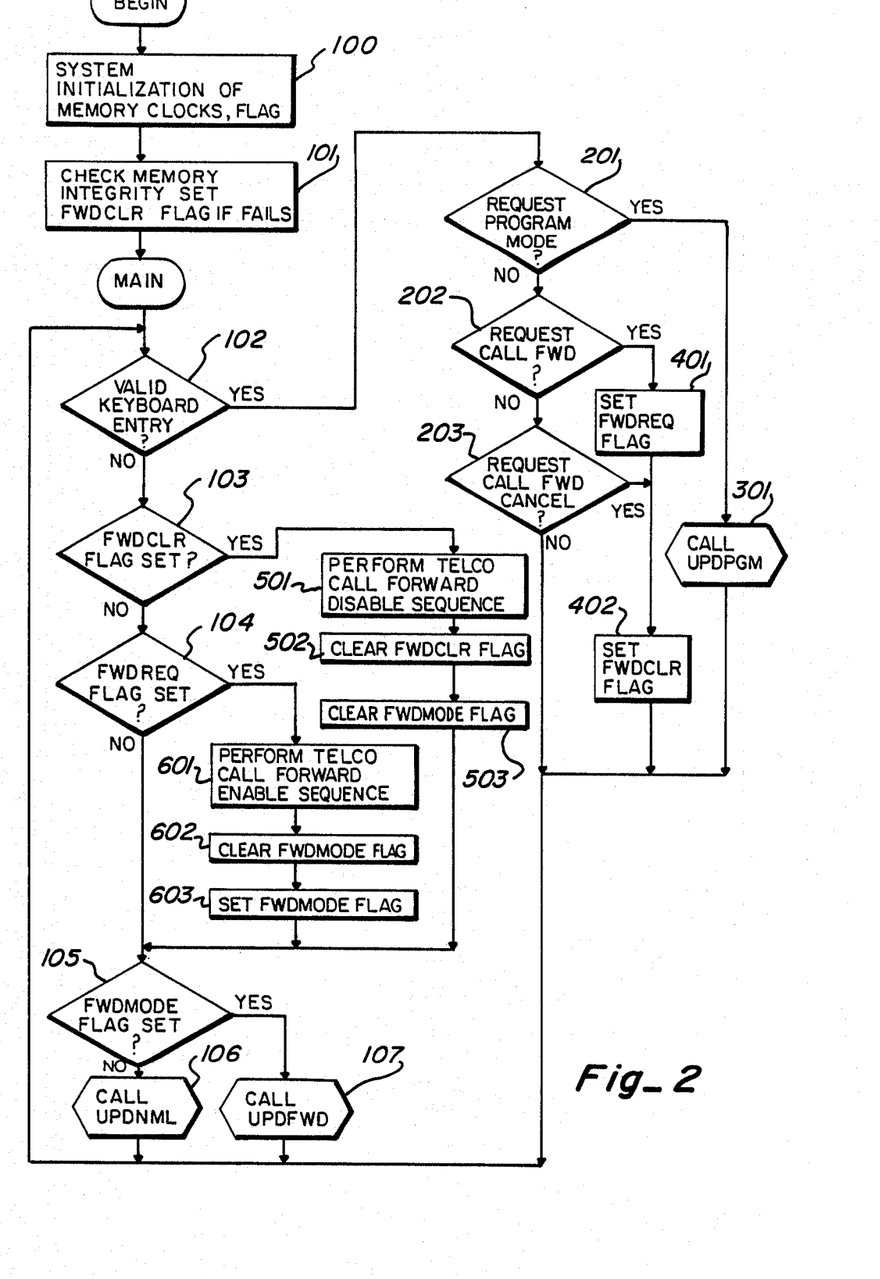
FIGS. 2–5 are flow charts of the operation and programs of the invention according to the schematic diagram of FIG. 1.

The software program sequence begins with a system initialization that clears all hardware devices and sets pointers, timers and flags in memory necessary for operation. In addition, the unit allows the configuration of certain parameters to improve flexibility and utility. These parameters include PBX access codes when installed in a PBX system, and ring count (RING CNT) which is the number of rings required for the telephone line to be seized when in the standby mode. This function is performed by reading information supplied by the user through configuration switch settings. Once this information is read and stored, this data is normally left unchanged until the device is physically moved to another phone line or system.

After initialization 100 is completed, memory integrity is tested 101. This step includes a test for the presence of a valid telephone number. If this test fails, and if the call forwarding mode is not in effect the unit will set the call forward clear (FWDCLR) flag to cancel the call forwarding mode.

The main loop of the program provides for touchtone keypad entry programming of a suitable telephone number 102 cancellation 103 of the call forwarding mode and initiation 104 of the call forwarding mode. In addition an examination is made of the ring detector circuitry through a check of the updated normal (UPDNML) data as well as a check of the updated call forwarding (UPDFWD) data which has previously been programmed.

The touchtone keypad is first tested for entry 102. If none is present the program advances to step 103 which clears the call forwarding flag set. When valid touchtone keypad information has been entered, it is in the form of a command request and causes one of the following three sequences to be performed. If the program mode has been requested then the program moves to the updating program subroutine (UPDPGM) 301 and allows the alteration of the preprogrammed telephone numbers to be made in memory. Once this programming has been completed the program exits and returns to the main loop. If the program mode has not been entered the initiate call forwarding routine 202 then sets both the call forwarding request (FWDREQ) and call forwarding flags. After these flags have been set the program then returns to the main loop. If call forwarding is not requested in step 202 the cancel call forwarding routine 203 is then entered which sets only the call forwarding clear (FWDCLR) flag and at this time the system returns to the main program loop.

At this point in the main program loop, the call forwarding clear flag is again tested. If this flag is properly set to cancel call forwarding 501, the device performs the standard calling sequence specified by the telephone company and programmed in the initialization step. Upon completion of the call forwarding cancellation, both the call forwarding clear 502 flag and the call forwarding mode flags are cleared and the program continues in the main loop. The next step 104 in the program is to test the call forwarding request flag. If this flag is set to establish call forwarding 601, the hardware device performs the standard calling sequence specified by the telephone company. Once completed the Call Forwarding Request flag is cleared 602 and the call forwarding mode flag is set 603. From this point the program continues through the main loop.

The call forwarding mode flag status 105 is checked in order to direct the program to one of two subroutines. When the device is in the call forwarding mode the update data call forwarding subroutine is accessed. If the call forwarding mode has not been selected then the update data normal subroutine 106 is then accomplished. At the exit of either one of these subroutines, the program again returns to the main loop.

Figure 3:
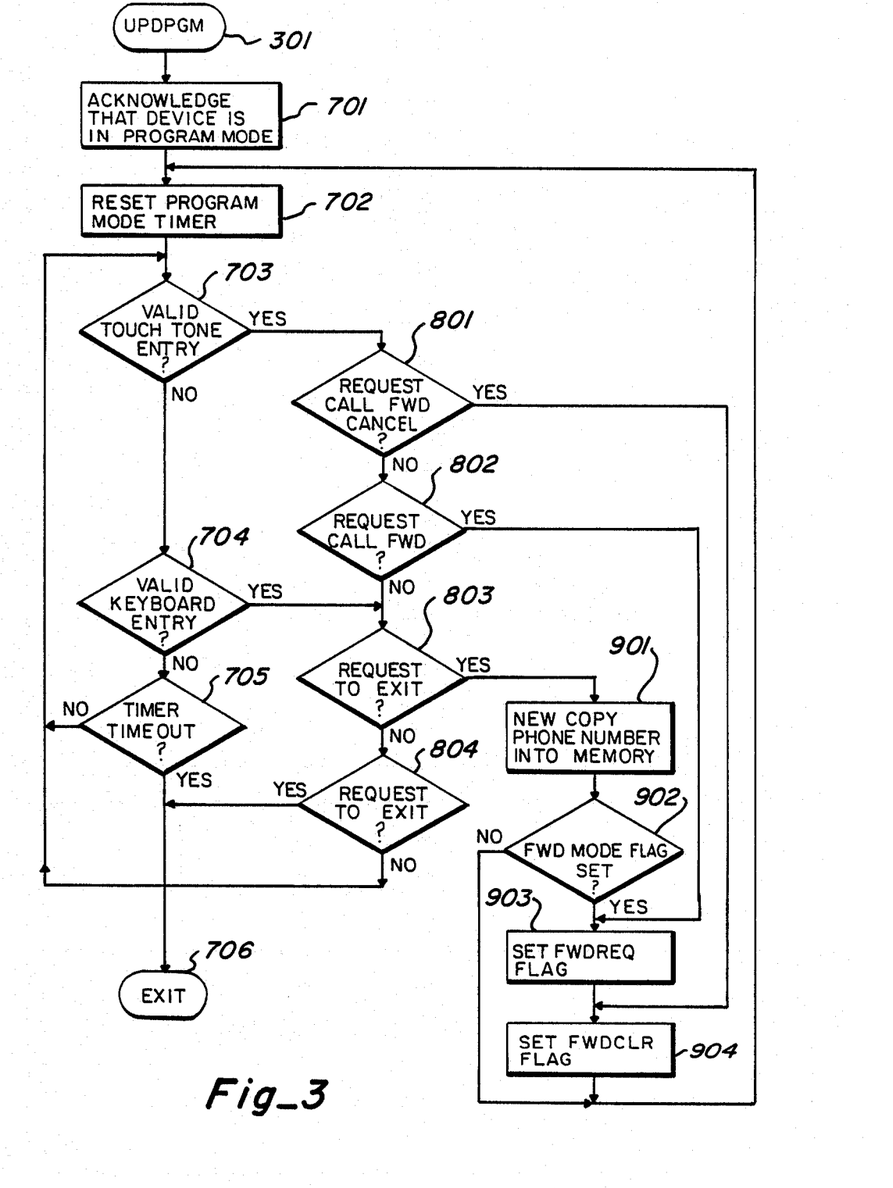

The updated program (UPDPGM) subroutine 301 as shown in FIG. 3 performs the tasks necessary for altering the call forwarding remote phone number. In addition, this subroutine will respond to entries made remotely via standard touchtone signals and provides a method for initiation and cancellation of call forwarding while in this mode.

At entry into this subroutine, an acknowledgement in the form of a tone or a synthesized verbal command is issued to the user as a prompt. A timer is started 702 that will time out 705, causing the program to exit from this subroutine if no touchtone signal entry is made within a reasonable time, typically 30 seconds.

Examination of the touchtone detector is made 703, and if a valid sequence of digits is detected, a determination will be made as to whether there is a request to cancel call forwarding 801, initiate call forwarding 802 or if a new telephone number is to be copied into memory. It is important to note that keypad entries from the device can only copy telephone numbers into the device.

When a newly copied telephone number is entered 901, the program determines if a change to a new call forwarding number is to be executed. This occurs only if the device is currently in the call forwarding mode when the telephone number is changed. This is accomplished by first testing for the status of the call forwarding mode flag 902. If this flag is set then both the call forwarding request 903 and the call forwarding clear 904 flags are set. The execution of the new telephone number into the telephone company call forwarding system occurs when the subroutine exits 706 to the main program loop.

Remote touchtone operation allows initiation and cancellation of the call forwarding mode in addition to the alteration of the telephone number which exists in memory. This is done by setting the appropriate call forwarding request 903 or call forwarding clear 904 flags.

Figure 5:
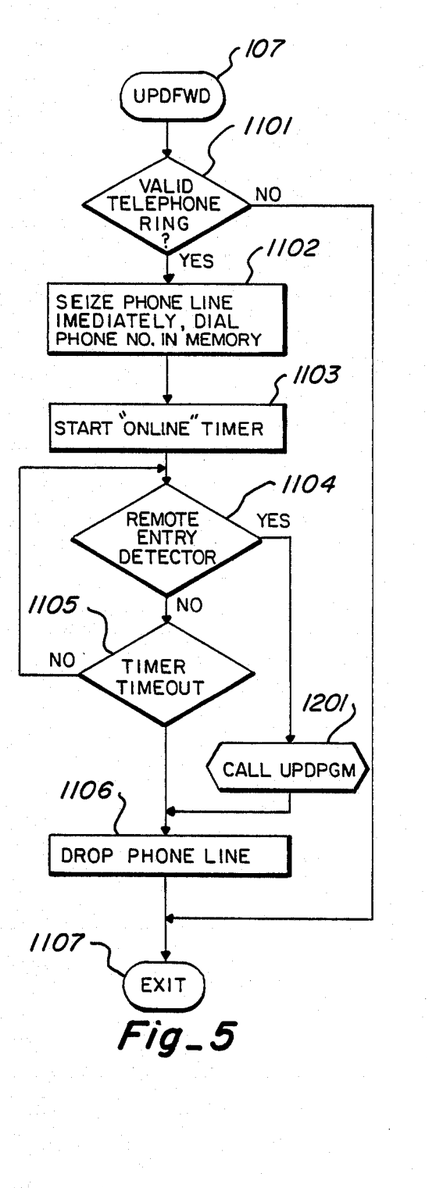

Exit from the update program subroutine 107 as shown in FIG. 5 provides a means to remotely access the device, and either to cancel the call forwarding mode of the operation or to change the current call forwarding telephone number to another number.

At entry, this subroutine examines the ring valid flag 1101 and if it is set, it immediately seizes the telephone line 1102. After waiting a short time period, the device then dials the call forwarding telephone number stored in memory. A timer is started 1103 that will cause the device to drop the telephone line 1105 if no response is made within a predetermined period of time. The touchtone (DTMF) detector is examined for a valid command code entry 1104 and if the proper code is present, the update program subroutine is initiated 1201 and the device is placed in the remote program mode. After remote programming of the device has been completed the telephone line is dropped 1106 and the program exits to the main loop 1107.

Figure 4:
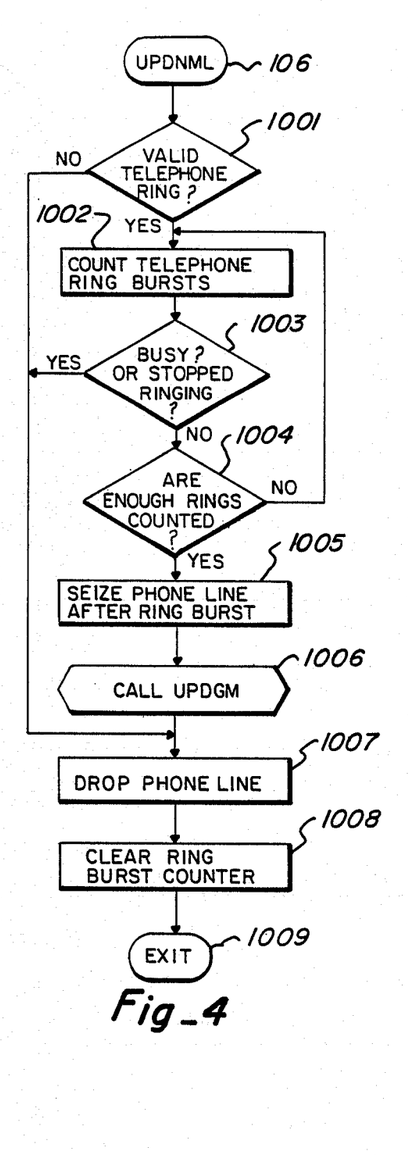

The updated normal subroutine as shown in FIG. 4 provides remote access to the device when the device is not in the call forwarding mode. This task is accomplished by seizing the telephone line after a prescribed number of incoming telephone rings. In this manner, the user can enter a telephone number or can initiate the call forwarding mode from a remote location.

At entry, the ring valid flag is examined 1001 to determine if a telephone ringup is occurring. The number of telephone rings is counted 1002. As the call-in continues, the telephone line is checked 1003 for a busy condition (telephone line seized by another device) or termination of the incoming call (calling party hangs up). This testing is accomplished by checking for the absence of telephone ring voltage on the line. Either case will cause a subsequent exit from this subroutine without seizing the telephone line. If the required number of incoming telephone rings is received 1004, the device then seizes the telephone line 1005 and enters the update program subroutine to allow remote access 1006 Once remote programming has been completed, the telephone line is dropped or released and the ring counter is cleared 1008 and this subroutine is exited 1009.

In order to be able to better understand the status condition of the program and the setting of the flags as part of the program routine the following brief description of the flag status is provided.

The Ring Valid flag is set whenever the telephone ring detector, through software, determines the presence of a ring up signal. Normally this can occur within less than 100 ms after the ring-up begins. The ring valid flag will be present for the duration of the ring burst.

The Call Forwarding Mode status flag indicates when the device is in the call forwarding mode. This flag is set when the call forwarding mode is initiated and cleared when call forwarding mode is cancelled. This flag status is also retained when power is removed from the device the same as any telephone number which is stored in the memory. This flag status is not initialized when power is applied to the device.

The Call Forwarding Clear status flag is set when a request to cancel call forwarding has been received. It is cleared when the request is executed and the call forwarding mode has been disabled. This flag will subsequently cause the call forwarding mode flag to be cleared.

The Call Forwarding Request flag is set when a request to initiate call forwarding has been issued. It is cleared when the request is executed and the device has been placed in the call forwarding mode. This status flag will subsequently cause the call forwarding mode flag to be set.

Operation

The following is a brief description of the physical operation of the device and how it accomplishes the required tasks.

Upon initial installation the device is physically connected to the subscriber's single telephone line which has call forwarding capability provided by the telephone company. Other devices such as an answering machine may also be connected to the telephone line without interfering with this device.

Operation of the device can be carried out by two methods, either via a touchtone keypad attached to the device (Local Mode) or remotely via the telephone line (Remote Mode).

When power is applied to the device, the program first initializes flags, timers and portions of memory and then resets specific hardware components as necessary. The device in sequence then performs a test of the integrity of the telephone number and status which is present in memory. The random access memory used in this device must be able to retain data when power outages occur so that the call forwarding status is preserved. This can be accomplished by an auxiliary battery or power source. Program verification of memory integrity provides a means of preventing use of an erroneous call forwarding number. An error will cause the cancellation sequence of call forwarding to be executed by the dialing of the proper cancellation codes to the telephone company equipment.

Once initialization and self-testing has been performed, the device continually examines the telephone line for incoming rings and the keyboard or keypad for any activity. At this point, the device is monitoring the telephone line and will respond to any telephone ring activity in one of two methods depending upon whether it is in either the standby or call forwarding mode.

Programming of the device can occur in one of two ways, either locally through the touchtone keypad or remotely. Either method allows the alteration of the telephone number contained in memory and/or the device status or mode. Local operation simply requires entry of command codes from the keypad. Remote access to the device is done via touchtone frequencies which are received in the DTMF receiver and depends upon the call forwarding status of the device. If the device is not in the call forwarding mode, access is gained by calling the device, which will respond after a preset number of rings such as eight, by seizing the line and waiting for command codes to be received. If the device is in the call forwarding mode, each time a ring is received on the user's telephone line the device seizes the line immediately and dials the call forwarding number. Because all telephone calls are forwarded by the telephone company to the same number as the telephone number stored in memory, the device will always get a busy signal when it is activated. However, by design, the user may call his telephone number from the remote preprogrammed number and will also cause activation of the device. If the user hangs up as soon as a busy signal is returned, at least within a few seconds, he will receive a telephone call from the device now ready for command codes to be received.

In all methods of access described above, if a command code is entered, the device begins running in the program mode. The user may then enter a new telephone number at this time. The device then checks for a proper entry and stores the number into memory. If no entry is made within a predetermined time interval, the program will revert back to the normal mode of operation. When a new telephone number is entered, and if call forwarding is in effect or has been requested, an automatic sequence is initiated to change the call forwarding number when the device resumes normal mode operation.

The automatic sequence which is initiated first causes the device to seize the telephone line and then dial the telephone company code, such as 73#, to cancel the telephone company call forwarding service. The telephone line is then released completing the cancellation sequence. After a short delay, the line is seized again, and the telephone company call forwarding operation is then initiated to the new number by dialing the suitable code such as 72#, followed by the new telephone number stored in memory. The telephone line is again dropped and the initiation portion of the sequence is repeated a second time to insure that the telephone central office establishes call forwarding to the new number, even if this new number may be busy at the time of this attempt.

Control of the call forwarding operation is also provided through commands presented to the device. Either initiation or cancellation of call forwarding will cause the device to seize the telephone line and perform the cancellation sequence and the number initiation sequence if call forwarding is requested.

While an apparatus and method for remotely programming telephone call forwarding has been shown and described in detail in this application it is to be understood that this invention is not to be limited to the exact form disclosed and changes in detail and construction of the invention may be made without departing from the spirit thereof.

What is claimed is:

1. A device for remotely changing a call forwarding telephone number for a user s telephone line from a remote telephone, the device comprising:
    (a) means for storing a programmed telephone number of the remote telephone line;
    (b) means for sensing a ring voltage on the user's telephone line and producing an actuation signal indicative thereof;
    (c) means responsive to said actuation signal for seizing the user's telephone line;
    (d) means for dailing out on said seized user's telephone line the programmed telephone number, to make contact with the remote telephone; and
    (e) means for changing the stored programmed telephone number from said remote telephone.

2. A device for remotely changing call forwarding telephone number as defined in claim 1 wherein said changing means includes means for receiving input signals on said seized user's telephone line and means responsive to said signals for controlling the operation of said device.

3. A device for remotely changing a call forwarding telephone number as defined in claim 2 wherein said receiving means includes means to decode said input signals and means to change the programmed telephone number is said storage means in accordance with said input signals.

4. A device for remotely changing a call forwarding telephone number as defined in claim 1 wherein said storage means is programmed to store preprogrammed codes for commanding and controlling the operation of said apparatus.

5. A device for remotely changing a call forwarding telephone number as defined in claim 1 wherein said device further includes microcomputer means for receiving said actuation signal and controlling said responsive and dialing means.

6. A device for remotely changing a call forwarding telephone number as defined in claim 2 which further includes a timing means whereby a predetermined time interval is started when the user's telephone line is seized and if the input signals are not received before the end of the time period the user's telephone line is released and the call is cancelled.

7. A method for changing a telephone company call forwarding system telephone number programmed at a user's location, a ring signal being generated on the user's telephone line when calls are forwarded to said programmed call forwarding number, said method including the steps of:
(a) detecting the ring signal on the user's telephone line when an incoming call is forwarded;
(b) seizing the user's telephone line;
(c) dialing out on the user's telephone line the programmed call forwarding number in order to make contact with the remote called telephone line; and
(d) receiving input signals on said user's seized telephone line from said remote telephone line to change the programmed telephone number at the user's location.

8. A method for remotely changing a call forwarding number as described in claim 7, which further includes the steps of receiving suitable input signals transmitted on said telephone line, processing said input signals which include a new remote telephone number, and storing said telephone number for later use.

9. A method for remotely changing a call forwarding number as described in claim, 7, which further includes the step of seizing the user's telephone line a second time and automatically dialing out on said line a required coded output and the changed telephone number to reprogram the telephone company call forwarding system.

10. A method for remotely changing a call forwardly number as described in claim 9 which further includes the step of seizing the user's telephone line a third time and repeating the dialing out of the required coded output and changed telephone number to confirm the reprogramming of the telephone company call forwarding system.

11. A device for remotely changing the programmed telephone number in a telephone company call forwarding system for a user's telephone line, the device comprising:
(a) means for detecting a ring signal on user's telephone line;
(b) signalling means responsive to said detecting means for signalling that a ring voltage has been received on said telephone line;
(c) means responsive to said signalling means for seizing the telephone line and dialing the preprogrammed telephone number on said user's telephone line to contact the remote telephone of the remote telephone number; and
(d) means for receiving input signals from said remote telephone to change said programmed telephone number.

12. A device for remotely changing a programmed telephone number in a telephone company call forwarding system as defined in wherein claim 11 said receiving means further includes;
(a) means for timing a predetermined time period;
(b) means for detecting when the programmed telephone goes off-hook; and
(c) means for receiving coded instructions on said user's telephone line within said predetermined time period for changing the programmed telephone number in the device so that the device can automatically change the telephone number in the telephone company call forwarding system after the line is released.

13. A device for remotely changing the programmed telephone company number in a telephone call forwarding system as defined in claim 12 which further includes means for seizing the user's telephone line a second time and dialing out the necessary codes and the changed telephone number to change the telephone company call forwarding system in accordance with the received instructions.

14. A device for remotely changing the telephone number in a telephone company call forwarding system as defined in claim wherein claim 11 said receiving means further includes means for sensing a busy signal on said dialed telephone line and means for releasing said user's telephone line in response to said received busy signal.

* * * * *